United States Patent
Williams et al.

(10) Patent No.: US 10,562,406 B2
(45) Date of Patent: Feb. 18, 2020

(54) SYSTEM AND METHOD FOR AUTONOMOUS CHARGING OF AN AUTONOMOUS VEHICLE

(71) Applicant: Toyota Motor Engineering & Manufacturing North America, Inc., Plano, TX (US)

(72) Inventors: Paxton S. Williams, Milan, MI (US); Colby S. Williams, Milan, MI (US); Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 3 days.

(21) Appl. No.: 15/918,601

(22) Filed: Mar. 12, 2018

(65) Prior Publication Data
US 2019/0275892 A1 Sep. 12, 2019

(51) Int. Cl.
*G05D 1/02* (2006.01)
*B60L 53/60* (2019.01)
*B60L 53/35* (2019.01)
*B60L 58/12* (2019.01)

(52) U.S. Cl.
CPC .............. *B60L 53/60* (2019.02); *B60L 53/35* (2019.02); *B60L 58/12* (2019.02); *G05D 1/0217* (2013.01); *B60L 2230/10* (2013.01); *B60L 2240/72* (2013.01); *B60L 2250/12* (2013.01); *G05D 2201/0213* (2013.01)

(58) Field of Classification Search
CPC .............. B60L 11/1838; B60L 11/1861; B60L 11/1827; B60L 2240/72; B60L 2230/10; B60L 2250/12; G05D 1/0217; G05D 2201/0213
See application file for complete search history.

(56) References Cited

U.S. PATENT DOCUMENTS

| 8,466,654 | B2 * | 6/2013 | Cook | H01Q 7/00 320/109 |
| 9,487,101 | B2 * | 11/2016 | Kees | B60L 53/37 |
| 2011/0025267 | A1 * | 2/2011 | Kamen | B60L 8/003 320/109 |
| 2012/0109519 | A1 * | 5/2012 | Uyeki | B60L 7/14 701/439 |
| 2012/0158229 | A1 * | 6/2012 | Schaefer | B60L 15/2045 701/22 |
| 2012/0173292 | A1 * | 7/2012 | Solomon | G06Q 10/02 705/5 |

(Continued)

FOREIGN PATENT DOCUMENTS

| EP | 2684733 A1 | 1/2014 |
| GB | 2500691 A | 10/2013 |
| WO | 2016/062367 A1 | 4/2016 |

*Primary Examiner* — Babar Sarwar
(74) *Attorney, Agent, or Firm* — Oblon, McClelland, Maier & Neustadt, L.L.P.

(57) ABSTRACT

The present disclosure relates to a system and methods for autonomous charging of an autonomous vehicle. Specifically, the present disclosure describes an autonomous vehicle subsystem configured to evaluate vehicle charge, identify possible charging stations, interact with a user to confirm a charging station, navigate to the selected charging station, and initiate and receive of a charge from a charging port at the charging station. User interaction may be vehicle-driven or user-driven.

20 Claims, 8 Drawing Sheets

(56) References Cited

U.S. PATENT DOCUMENTS

| | | | | |
|---|---|---|---|---|
| 2012/0185379 | A1* | 7/2012 | Tu | B60L 53/665 705/39 |
| 2013/0009607 | A1* | 1/2013 | Nishibayashi | B60L 53/63 320/162 |
| 2013/0020993 | A1* | 1/2013 | Taddeo | H02J 7/0027 320/109 |
| 2013/0057210 | A1* | 3/2013 | Nergaard | B60L 53/305 320/109 |
| 2013/0307475 | A1* | 11/2013 | Kishiyama | H02J 7/0027 320/109 |
| 2014/0015493 | A1* | 1/2014 | Wirz | H02J 7/025 320/137 |
| 2014/0062401 | A1* | 3/2014 | Gadh | B60L 11/1838 320/109 |
| 2014/0074523 | A1* | 3/2014 | Turner | G06Q 10/02 705/5 |
| 2014/0089016 | A1* | 3/2014 | Smullin | G06Q 10/02 705/5 |
| 2014/0156108 | A1* | 6/2014 | Reich | G01C 21/3469 701/1 |
| 2014/0163854 | A1* | 6/2014 | Matsumoto | G01C 21/3667 701/123 |
| 2015/0189465 | A1* | 7/2015 | Siliski | H04W 52/0296 455/456.3 |
| 2015/0202975 | A1* | 7/2015 | Solomon | G06Q 10/06316 705/7.26 |
| 2015/0321570 | A1* | 11/2015 | Cun | G06O 50/06 705/34 |
| 2015/0345971 | A1* | 12/2015 | Meuleau | G01C 21/3492 701/1 |
| 2015/0367740 | A1* | 12/2015 | McGrath | B60L 11/184 320/137 |
| 2016/0023557 | A1* | 1/2016 | Dimke | B60L 5/42 320/108 |
| 2017/0043674 | A1* | 2/2017 | DeBoer, III | B60L 11/1844 |
| 2017/0127608 | A1* | 5/2017 | Biber | B60L 53/35 |
| 2017/0140603 | A1* | 5/2017 | Ricci | B60L 11/182 |
| 2017/0146354 | A1* | 5/2017 | Boss | B60L 58/12 |
| 2017/0167887 | A1* | 6/2017 | Choi | G01C 21/3629 |
| 2017/0225581 | A1* | 8/2017 | Chai | B60L 11/1827 |
| 2017/0253131 | A1* | 9/2017 | Kilic | B60L 53/305 |
| 2017/0282736 | A1* | 10/2017 | Goei | B60L 53/665 |
| 2018/0081360 | A1* | 3/2018 | Bostick | G05D 1/0088 |
| 2018/0189683 | A1* | 7/2018 | Newman | G06Q 10/02 |
| 2018/0375349 | A1* | 12/2018 | Bonilla | H02J 7/0027 |
| 2019/0016384 | A1* | 1/2019 | Carlson | B62D 15/0285 |
| 2019/0275892 | A1* | 9/2019 | Williams | B60L 53/35 |

* cited by examiner

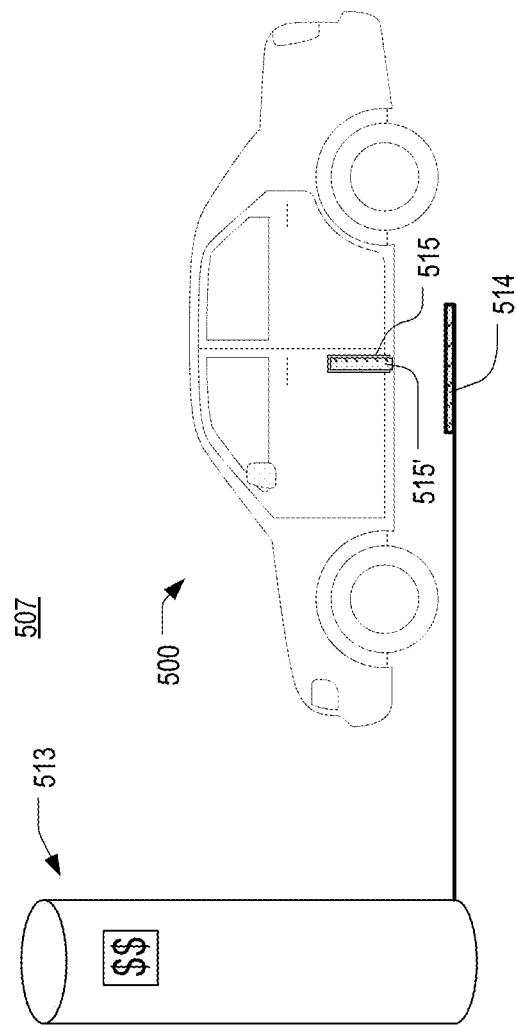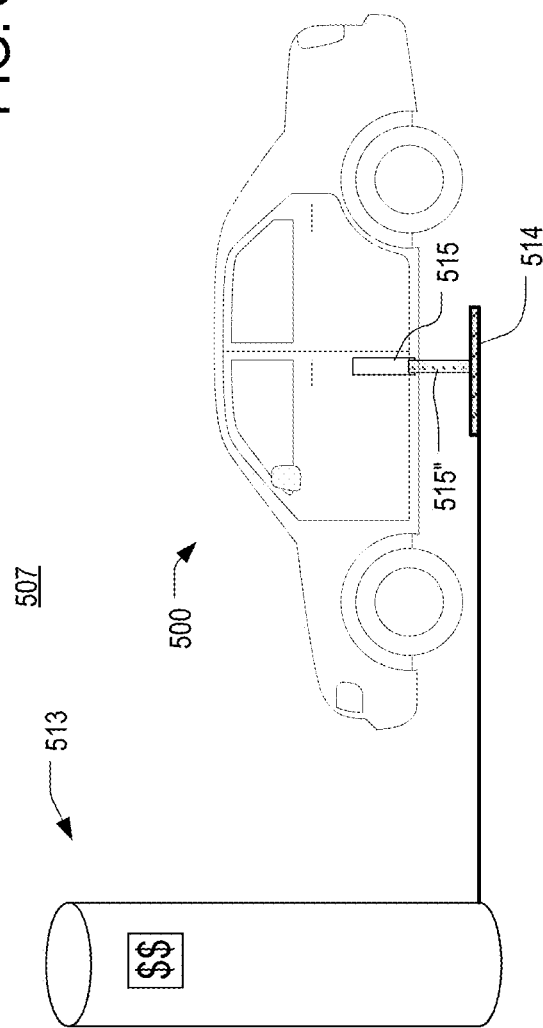

SYSTEM AND METHOD FOR AUTONOMOUS CHARGING OF AN AUTONOMOUS VEHICLE

BACKGROUND

As autonomous vehicles become ubiquitous, the technologies therein have become increasingly exploited by other connected devices. A desire to delegate tasks to vehicles, such as navigation and fuel management, has led to the development of a variety of device software applications intended to communicate, process and execute a user's command. For example, when prompted, and according to vehicle need, a fueling station may be located and identified based on user preference, as gathered from prior user history. U.S. Patent Application No. 2017/0140603 A1 entitled "Multi-vehicle communications and control system" by Ricci is directed to a system for vehicle fleet management comprising a base management system configured to evaluate a vehicle charge, identify a charging station, negotiate a charging price, and provide this information to the driver of a vehicle. An integrated platform where an autonomous vehicle renders a user a consultant, however, has yet to be developed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to an apparatus and a method for semi-autonomous charging of an autonomous vehicle battery, comprising measuring a current charge of the autonomous vehicle battery, determining, via a processing circuitry and based upon the measuring of the current charge of the autonomous vehicle battery, a battery charge residual capacity of the autonomous vehicle battery, acquiring, via the processing circuitry, from a network of charging stations and based upon the determining of the battery charge residual capacity of the autonomous vehicle battery with respect to a pre-determined threshold, information related to one or more charging stations of the network of charging stations, recommending, via the processing circuitry, a charging station based upon the information related to the one or more charging stations of the network of charging stations, querying, via a user interface, a selection by a user regarding the recommended charging station, reserving, via the processing circuitry and based upon the selection by the user regarding the recommended charging station, a charging port at the selected charging station, navigating, via the processing circuitry, to the reserved charging port at the selected charging station, and receiving, via a charging subsystem, a charge from the reserved charging port at the selected charging station.

The present disclosure further relates to an apparatus and a method for semi-autonomous recharging of an autonomous vehicle battery, comprising receiving, via a user interface, a user command from a user, measuring, in response to the user command, a current charge of the autonomous vehicle battery, determining, via a processing circuitry and based upon the measuring of the current charge of the autonomous vehicle battery, a battery charge residual capacity of the autonomous vehicle battery, acquiring, via the processing circuitry, from a network of charging stations and based upon the determining of the battery charge residual capacity, information related to one or more charging stations of the network of charging stations, recommending, via the processing circuitry, a charging station based upon the information related to the one or more charging stations of the network of charging stations, querying, via the user interface, a selection by the user regarding the recommended charging station, reserving, via the processing circuitry and based upon the selection by the user regarding the recommended charging station, a charging port at the selected charging station, navigating, via the processing circuitry, to the reserved charging port at the selected charging station, and receiving, via a charging subsystem, a charge from the reserved charging port at the selected charging station.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5A is an illustration of an autonomous vehicle and charging arm, according to an exemplary embodiment of the present disclosure;

FIG. 5B is an illustration of an autonomous vehicle and charging arm, according to an exemplary embodiment of the present disclosure;

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The present disclosure describes a system and method for autonomous charging of an autonomous vehicle. In accomplishing this, a system is developed comprising a user interface, an autonomous vehicle (AV), and a cloud-connected network of charging stations and charging ports, each in wireless communication with the other system components. The autonomous vehicle further comprises a deployable charging arm which, in tandem with geolocation technologies, allows for user-free recharging of on-board vehicle batteries. Together, the system makes it possible for users to continue performing desired tasks of daily living while their vehicle accomplishes requisite routine maintenance, including battery recharging.

Figure 1:
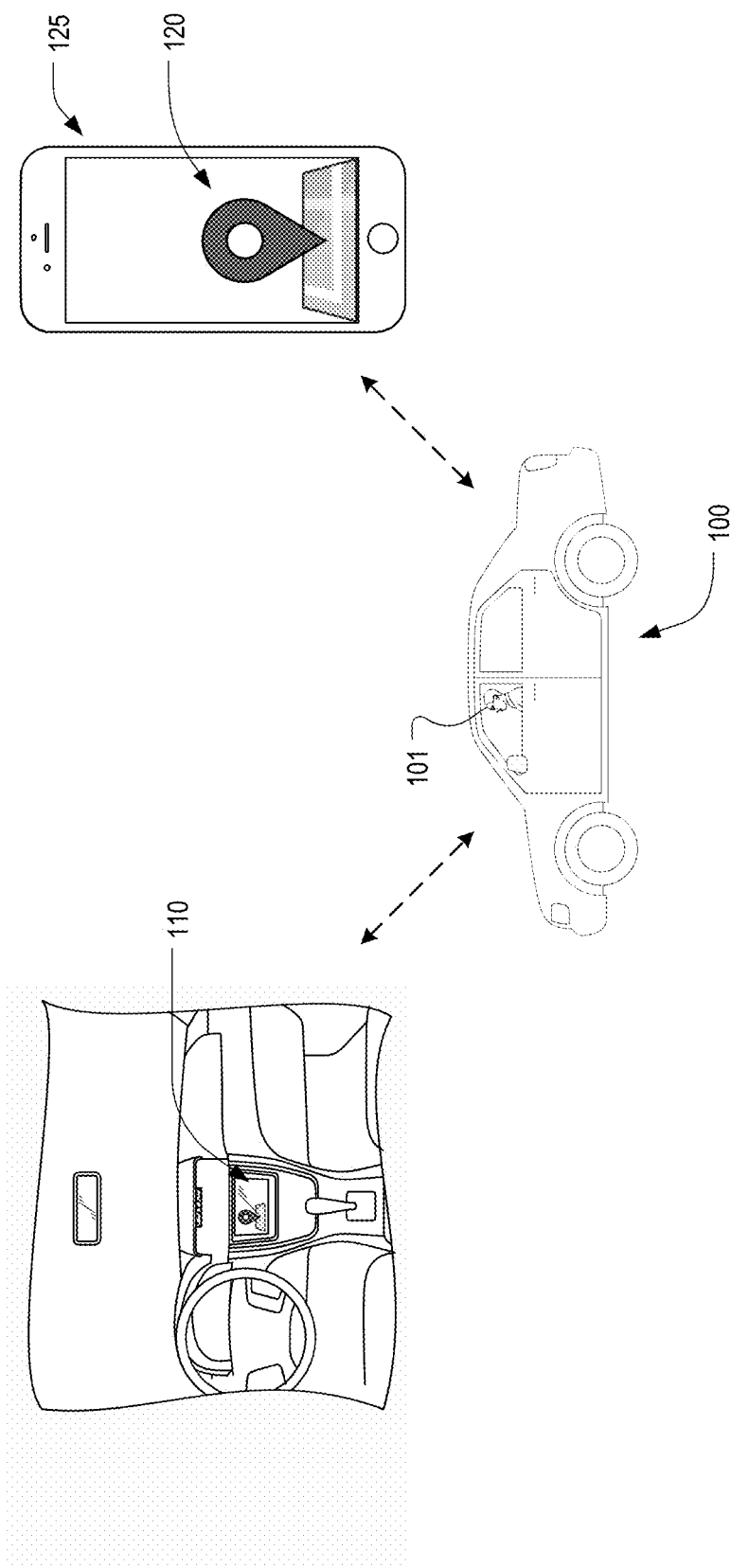
FIG. 1 is a system diagram of an autonomous vehicle and user interfaces, according to an exemplary embodiment of the present disclosure.

FIG. 1 is a system diagram of an AV and a plurality of user interfaces. In an exemplary embodiment, a user 101 is a passenger in an autonomous vehicle 100. During travel, the user may engage with the vehicle via a vehicle-based user interface 110 or a user device-based user interface 120. In an embodiment, the user device-based user interface 120 is a user device 125 including but not limited to a smartphone.

According to an embodiment, the user 101 is traveling as a passenger in the AV 100 and interacts with the AV 100 via one or more interactions. In a first interaction, referred to as vehicle-directed user interaction, a processing circuitry of a vehicle subsystem of the AV 100 continuously monitors battery charge depletion in the context of a pre-determined threshold at which an indication to recharge is presented to the user 101. This pre-determined threshold, arbitrarily defined by the manufacturer, represents a level of battery depletion at which recharge should be sought. When the battery charge is depleted below the pre-determined threshold, an alert is presented to the user 101. Simultaneously, the processing circuitry of the vehicle subsystem of the AV 100, referred to herein as the vehicle subsystem, sends and receives information with internet-connected network of charging stations via wireless communication. The vehicle subsystem receives information from nearby charging stations with descriptors including but not limited to charging port availability, distance from current position, travel time from current position, and estimated cost of vehicle charging ($/kWh). A recommended charging station is then suggested to the user 101. The recommendation may include the anticipated cost of the charge and the time required to charge. If the user 101 accepts the charging station suggestion from the vehicle subsystem, thereby authorizing the billing amount, the AV 100 initiates navigation to the suggested charging station. If the user 101 rejects the charging station suggestion from the vehicle subsystem, a subsequent charging station is suggested until an agreed upon charging station is arrived at.

During charging station recommendation, the vehicle subsystem may also provide a suggestion in context of charging station preferences as determined from a cloud-based user-profile. In an example, if a user 101 historically frequents a specific charging station, as logged in credit card statements or in a vehicle-specific user activity profile, future recommendations by the vehicle subsystem will be provided in context of that historical user preference.

According to an embodiment, and in a second interaction, referred to as user-directed user interaction, the processing circuitry of the vehicle subsystem of the AV 100 responds to a user query. The user query may be an instruction to perform requisite routine maintenance of the AV 100 while the user 101 completes another task outside of the AV 100. In an exemplary embodiment, the user 101 may indicate to the AV 100 a desire to have the vehicle battery recharged while the user 101 is performing another task outside of the vehicle. Therefore, the user instructs the AV 100 to identify, locate, and navigate to a charging station. Following recharge of the vehicle battery, the AV 100 returns to a location that may be specified by the user 101 including but not limited to a drop off location, a location collocated with a geolocation of a user device 125, or another location as indicated by the user 101.

In an example, a user 101 is traveling as a passenger in an AV 100 and arrives at a grocery store. As opposed to the AV 100 parking itself and waiting for the user 101 to gather groceries and return to the AV 100, the user 101 may command the AV 100 to recharge the vehicle battery. This command may be communicated to the AV 100 via the vehicle-based user interface 110. In response to the command, the processing circuitry of the vehicle subsystem of the AV 100, referred to herein as the vehicle subsystem, sends and receives information with an internet-connected network of charging stations via wireless communication. The vehicle subsystem receives information from nearby charging stations with descriptors including but not limited to charging port availability, distance from current position, travel time from current position, and estimated cost of vehicle charging ($/kWh). A recommended charging station is then suggested to the user 101. The recommendation may include the anticipated cost of the charge and the time required to charge. If the user 101 accepts the charging station suggestion from the vehicle subsystem, thereby authorizing the billing amount, the AV 100 initiates navigation to the suggested charging station following the user's exit from the vehicle cabin, as indicated by the geolocation of a user's user device 125. If the user 101 rejects the charging station suggestion from the vehicle subsystem, a subsequent charging station is suggested until a charging station is agreed upon.

During charging station recommendation, the vehicle subsystem may also provide a suggestion in context of charging station preferences as determined from a cloud-based user-profile. In an example, if a user 101 historically frequents a specific charging station, as logged in credit card statements or in a vehicle-specific user activity profile, future recommendations by the vehicle subsystem will be provided in context of that historical user preference.

According to an embodiment, user-directed user interaction with the AV 100 may be completed via a user device-based user interface 120. The user device-based user interface 120 may include but is not limited to a user device 125. Charging commands may be communicated by the user 101 to the AV 100 via the user device-based user interface 120.

In an example, a user 101 is traveling as a passenger in an AV 100 and arrives at a grocery store. As instructed by the user 101, the AV 100 parks and waits for the user 101 to gather groceries and return. After exiting the AV 100, however, the user 101 decides it is an appropriate time to command the AV 100 to recharge the vehicle battery. This command is communicated to the AV 100, from outside the vehicle, via the user device-based user interface 120. In response to the command, the processing circuitry of the vehicle subsystem of the AV 100, referred to herein as the vehicle subsystem, sends and receives information with an internet-connected network of charging stations via wireless communication. This information comprises information describing nearby charging stations including but not limited to charging port availability, distance from current position, travel time from current position, and estimated cost of vehicle charging ($/kWh). A recommended charging station is then suggested to the user 101 via the user device-based user interface 120. The recommendation may include the anticipated cost of the charge and the time required to charge. If the user 101 accepts the charging station suggestion from the vehicle subsystem, thereby authorizing the billing amount, the AV 100 initiates navigation to the suggested charging station. If the user 101 rejects the charging station suggestion from the vehicle subsystem, a subsequent charging station is suggested until a charging station is agreed upon.

During charging station recommendation, the vehicle subsystem may also provide a suggestion in context of charging station preferences as determined from a cloud-based user-profile. In an example, if a user 101 historically frequents a specific charging station, as logged in credit card statements or in a vehicle-specific user activity profile, future recommendations by the vehicle subsystem will be provided in context of that historical user preference.

According to an exemplary embodiment of the present disclosure, a charging command may be initiated via the vehicle-based user interface 110 inside the vehicle and continued via the user device-based user interface 120 of the user device 125 inside or outside of the vehicle.

According to an exemplary embodiment, in the first interaction and the second interaction, the AV 100 navigates to the agreed upon charging station and prepares to receive a charge. In an embodiment, following agreement to a charging station and a charging rate by the user 101, the vehicle subsystem reserves a charging port at the charging station. In order to ensure the correct reservation and confirm the identity of the user's AV 100 upon arrival, a variety of validation techniques may be employed. In an example, identifier keys are assigned, respectively, to the charging port and the AV 100, and are logged in a cloud-storage module. Upon arrival at the charging port, and in coordination with the cloud-storage module, each identifier key is authenticated by the co-location of each device within a geofence that forms a perimeter around the charging port. If the identifier keys of the AV 100 and the charging port are authenticated within the geofence, the charging session may be initiated. To initiate the charging session, a charging arm of the AV 100 is deployed into contact with a charging plate, attached to the charging port via electrical cabling, disposed in the ground immediately under the AV 100. Following receipt of the intended charge, the charging arm is retracted into the AV 100 and the AV returns to the prior location of the user to await further commands. In another embodiment, power transfer is completed via wireless modalities including but not limited to induction.

Figure 2:
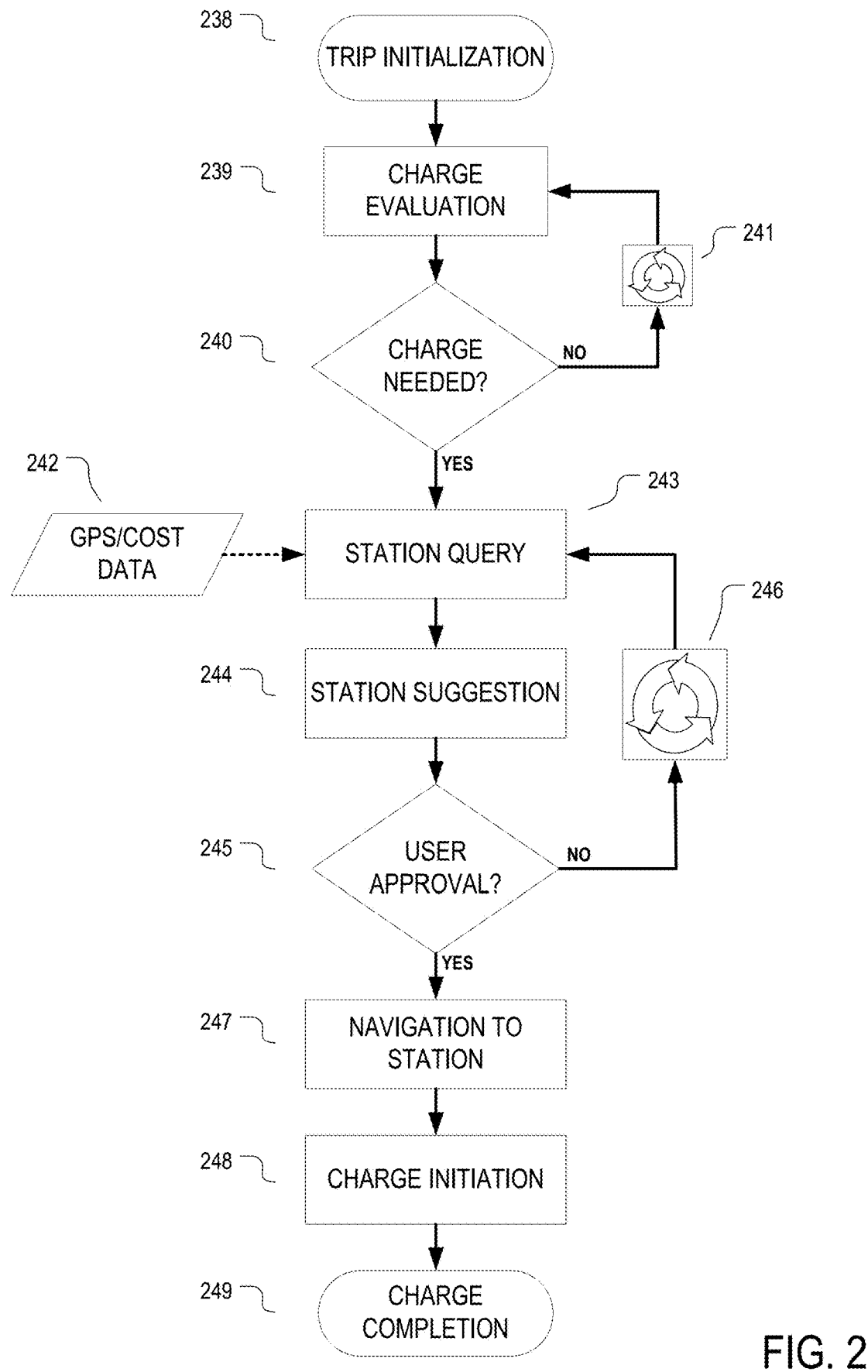
FIG. 2 is a flowchart of a vehicle-directed user interaction, according to an exemplary embodiment of the present disclosure.

FIG. 2 is a flowchart of a vehicle-directed user interaction. According to an exemplary embodiment of the present disclosure, during a trip, an AV continuously evaluates battery charge and, upon the battery charge falling below a pre-determined threshold, determines the battery charge to be sufficiently depleted. As a result, the AV alerts the user to one or more charging station options based upon determined location and charging price. Following approval of one of the one or more charging station options, the AV navigates to the selected charging station and proceeds to receive a charge from a reserved charging port therein.

This high-level description of a vehicle-directed user interaction is described in detail in the flowchart of FIG. 2. According to an exemplary embodiment of the present disclosure, follow trip initialization 238, a vehicle subsystem of the AV begins continuous battery charge evaluation 239. During operation, charge evaluation may occur continuously, at discrete intervals (i.e., 1 second, 10 seconds, 30 seconds, 60 seconds, 120 seconds, etc.), or as requested by the user. Battery charge, or battery residual capacity, may be determined by a variety of approaches including but not limited to a comparison of a charge current and discharge voltage at two points. In order to accomplish this, an estimated discharge voltage is multiplied by the measured current charge of a battery, the product of which is integrated into the most recent battery residual capacity determination to provide a new battery residual capacity. This new battery residual capacity can be used during repeated evaluations of the battery residual capacity as a reference point from which to estimate battery depletion. Such battery residual capacity evaluation is understood by one of ordinary skill in the art. If it is determined that the battery charge is below a pre-determined threshold 240, a battery charge is necessary and the vehicle subsystem of the AV proceeds accordingly. If the battery charge is above the pre-determined threshold 240, the vehicle subsystem of the AV determines that no charge is currently necessary and the charge evaluation process is repeated 241. Following a determination that charge is required, the vehicle subsystem queries and acquires data related to nearby charging stations 243. This query and acquisition is completed via wireless communication between the vehicle subsystem of the AV and a cloud-connected network of charging stations and charging ports. When requested, data from nearby cloud-connected charging stations and charging ports are provided to the vehicle subsystem of the AV where it is processed prior to presentation to the user. Such cloud-based data acquisition is understood by one of ordinary skill in the art. This data 242 includes information from one or more charging stations regarding availability, distance from current AV position, travel time from current AV position, estimated charging time, and estimated cost of vehicle charging ($/kWh). Based on the current battery charge and the above parameters, a charging station recommendation is made to the user 244 via the vehicle-based user interface. If the charging station recommendation, and charging rate therein, is deemed suitable by the user 245 as indicated via the vehicle-based user interface, the vehicle subsystem of the AV reserves a charging port at the charging station and begins navigation to the charging station 247. If the location, price, or other descriptor of the recommended charging station is not suitable 245, the process is repeated 246 and a new station is recommended 244 following data query and acquisition 242 from nearby stations 243.

Concurrent with AV navigation to the charging station, secure authentication information, in the form of identifier keys, is generated and assigned to the AV and to the charging port at the charging station. These identifier keys are stored in a cloud-storage module for subsequent access. According to an embodiment, the cloud-storage module is a well-known internet-connected microcomputer having CPU (central processing unit), ROM (read only memory), RAM (random access memory) and I/O (input and output) interface. Pertinent data related to charging station parameters and charging authentication keys are stored in a memory unit. Therefore, the processing circuitry of the vehicle subsystem of the AV may access and store data.

According to an exemplary embodiment of the present disclosure, the identifier keys are randomly generated and unique identifier keys. In another embodiment, the identifier keys assigned to the charging port and the AV are identical. Therefore, in order to authorize charging upon AV arrives at the charging port, the identifier key of the AV must be identical to the identifier key of the charging port.

According to an exemplary embodiment of the present disclosure, a geofence may be established around a perimeter of the charging port at the time the identifier keys are generated and assigned. The geofence is of a shape sufficient to include a respective charging plate and a properly aligned AV. Such geofencing techniques are understood by one of ordinary skill in the art. Following establishment of the geofence during charging port reservation, the identifier keys are hidden from the AV and the charging port until the AV enters the geofence upon arrival at the charging station. Upon entering the geofence, the identifier keys are again visible to the AV and to the charging port, and in the case the identifier keys match, charging is authorized and may commence.

In an example, and having arrived at the reserved charging port at the charging station, the AV initiates charging of the AV battery 248. As described above, initiation first requires confirmation of co-location of the charging port and the AV according to the previously stored identifier keys, ensuring that the correct AV is receiving the charge. After confirmation of the identity of the two parties, charging commences. Following the dispensation of the intended charging voltage at the intended charging price, the charging session is completed 249 and the AV returns to normal travel activities.

According to an embodiment of the present disclosure, information related to the recommended charging station, and the user's response thereto, is displayed to the user via a user device-based user interface. The user device of the user device-based user interface may be a smartphone or similar internet-connected user device.

Figure 3:
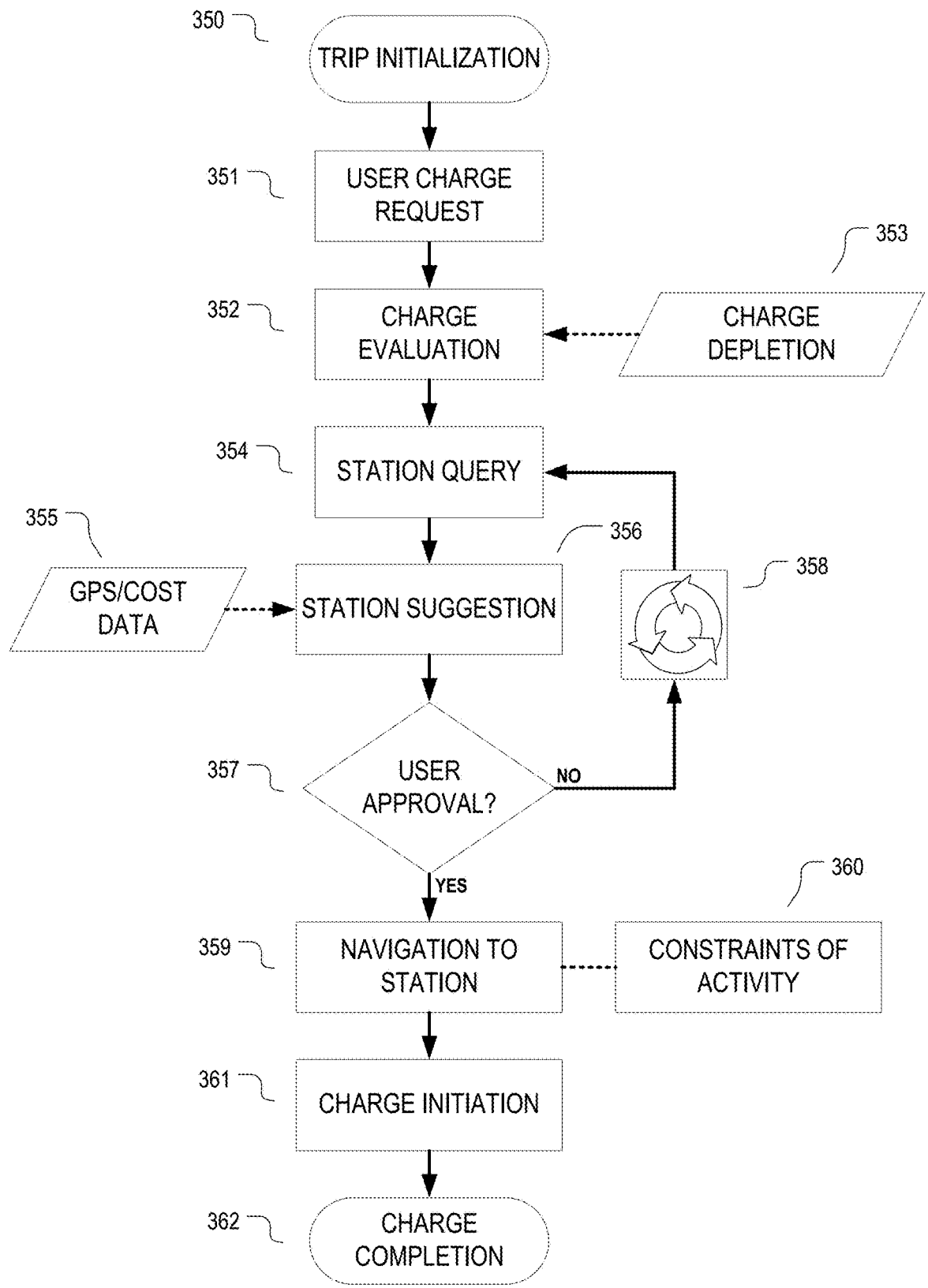
FIG. 3 is a flowchart of a user-directed user interaction, according to an exemplary embodiment of the present disclosure.

FIG. 3 is a flowchart of a user-directed user interaction. According to an exemplary embodiment of the present disclosure, during a trip, a user decides to have the AV perform routine maintenance, such as recharging, while the user performs another activity, such as grocery shopping. At the user's command, the vehicle subsystem of the AV begins evaluation of battery charge, determining battery charge depletion and quantifying the required charge to replenish the battery. The AV then alerts the user to one or more charging station options based upon location and charging price. Following approval of one of the one or more charging station options, the user exits the AV to perform another activity and the AV navigates to the selected charging station and proceeds to receive a charge from a charging port.

This high-level description of a user-directed user interaction is described in detail in the flowchart of FIG. 3. According to an exemplary embodiment of the present disclosure, following trip initialization 350, and after arrival at a destination, a user submits a charge request 351. In response, a vehicle subsystem of the AV begins battery charge evaluation 352. During operation, charge evaluation may occur continuously, at discrete intervals (i.e., 1 second, 10 seconds, 30 seconds, 60 seconds, 120 seconds, etc.), or as requested by the user. Battery charge, or battery residual capacity, may be determined by a variety of approaches including but not limited to a comparison of a charge current and discharge voltage at two points. In order to accomplish this, an estimated discharge voltage is multiplied by the measured current charge of a battery, the product of which is integrated into the most recent battery residual capacity determination to provide a new battery residual capacity. This new battery residual capacity can be used during repeated evaluations of the battery residual capacity as a reference point from which to estimate battery depletion. Such battery residual capacity evaluation is understood by one of ordinary skill in the art. According to the determined charge depletion 353, the vehicle subsystem of the AV begins querying and acquiring data related to nearby charging stations 354. This query and acquisition is completed via wireless communication between the vehicle subsystem of the AV and a cloud-connected network of charging stations and charging ports. When requested, data from nearby cloud-connected charging stations and charging ports are provided to the vehicle subsystem of the AV where it is processed prior to presentation to the user. Such cloud-based data acquisition is understood by one of ordinary skill in the art. This data 355 includes information from one or more charging stations regarding availability, distance from current AV position, travel time from current AV position, estimated charging time, and estimated cost of vehicle charging ($/kWh). Based on the current battery charge and the above parameters, a charging station recommendation is made to the user 356 via the vehicle-based user interface. If the charging station recommendation, and charging rate therein, is deemed suitable by the user 357, as indicated via the vehicle-based user interface, the vehicle subsystem of the AV reserves a charging port at the charging station and prepares to begin navigation to the charging station 359. If the location, price, etc. of the recommended charging station is not suitable 357, the process is repeated 358 and a new station is recommended 356 following data query and acquisition 354 from nearby stations 355. Following approval of the recommended charging station by the user 357, the user exits the AV and the AV begins navigation to the charging station 359. Concurrent with AV navigation to the charging station, secure authentication information, in the form of identifier keys, is generated and assigned to the AV and to the charging port at the charging station. These identifier keys are stored in a cloud-storage module for subsequent access. According to an embodiment, the cloud-storage module is a well-known internet-connected microcomputer having CPU (central processing unit), ROM (read only memory), RAM (random access memory) and I/O (input and output) interface. Pertinent data related to charging station parameters and charging authentication keys are stored in a memory unit. Therefore, the processing circuitry of the vehicle subsystem of the AV may access and store data.

According to an exemplary embodiment of the present disclosure, the identifier keys are randomly generated and unique identifier keys. In another embodiment, the identifier keys assigned to the charging port and the AV are identical. Therefore, in order to authorize charging upon AV arrives at the charging port, the identifier key of the AV must be identical to the identifier key of the charging port.

According to an exemplary embodiment of the present disclosure, a geofence can be established around a perimeter of the charging port at the time the identifier keys are generated and assigned. The geofence is of a shape sufficient to include a respective charging plate and a properly aligned AV. Such geofencing techniques are understood by one of ordinary skill in the art. Following establishment of the geofence, the identifier keys are hidden from the AV and the charging port until the AV enters the geofence upon arrival at the charging station. After entering the geofence, the identifier keys again become visible to the AV and to the charging port, and in the case the keys match, charging is authorized and may commence.

In an example, and having arrived at the reserved charging port at the charging station, the AV initiates charging of the AV battery 361. As described above, initiation first requires confirmation of co-location of the charging port and the AV according to the previously stored identifier keys, ensuring that the correct AV is receiving the charge. After confirmation of the identity of the two parties, charging commences. Following the dispensation of the intended charging voltage at the intended charging price, the charging session is completed 362 and the AV returns to normal travel activities.

According to an embodiment, user activity constraints 360 are considered with respect to total charging time and AV commands following battery charging. In an example, if the time to full charge, including travel to and from the charging station, is greater than the time of the intended activity of the user, the AV may reduce the total charge received in order to return to the user in conjunction with the user completing the intended activity. Moreover, if the time to full charge, including travel to and from the charging station, is less than the time of the intended activity of the user, the AV may be commanded to perform additional tasks or to return to a location determined by the user to wait for further commands.

According to an embodiment, user interaction with the vehicle subsystem of the AV may be completed via a user device-based user interface. In an embodiment, the user device is smartphone. The vehicle subsystem of the AV may be controlled by the vehicle-based user interface, the user device-based user interface, or a combination thereof. A hardware description of an embodiment of the vehicle-based user interface is provided in FIG. 7. A hardware description of an embodiment of the user device-based user interface is provided in FIG. 8.

According to an embodiment, following receipt of intended charge from the charging station, the AV may alert the user, via the user device-based user interface, of the completed charge and may request additional instruction. The user may respond by instructing the AV to return to the drop-off location, a location as informed by the global positioning system (GPS) function of the user device, or a different pickup location. Further, the user may respond by instructing the vehicle that additional time is required prior to AV return to a specific location. In an example, the user may instruct the AV, via the user device-based user interface, that the user will not be ready for pickup for 15 minutes. The AV, accordingly, delays return to the pickup location until the user-defined increment of time has passed.

According to another embodiment, following receipt of intended charge from the charging station, the AV may navigate to a parked location within a radius of the user's location, according to GPS, and wait for further instruction. The user may then interact with the AV without prompt from the AV, via the user device-based user interface. The user may instruct the AV to return to a pickup location from the parked location and await the user to enter the vehicle.

Figure 4:
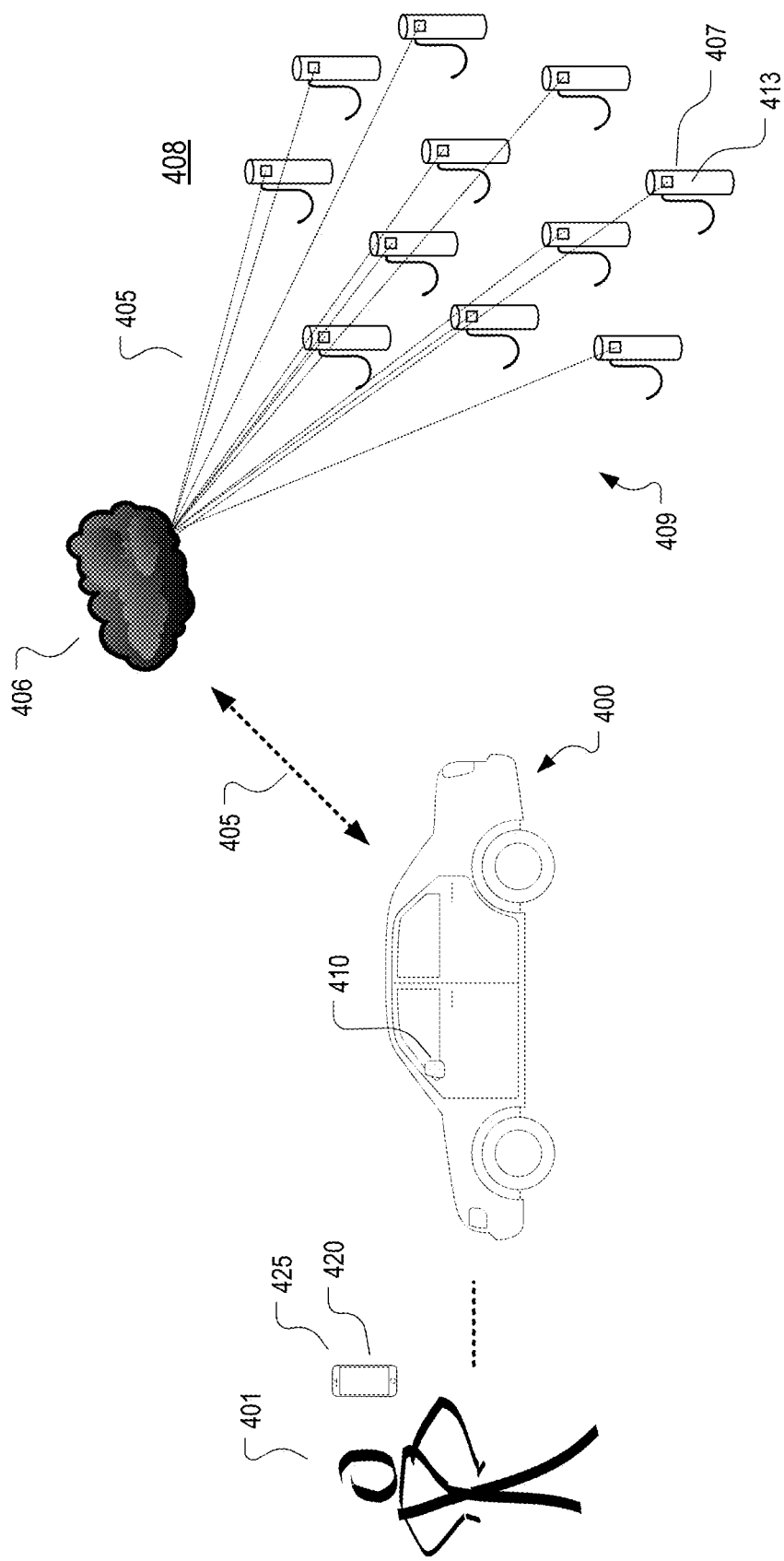
FIG. 4 is a network system diagram of an autonomous vehicle in communication with a station network, according to an exemplary embodiment of the present disclosure.

FIG. 4 is a network system diagram of an autonomous vehicle in communication with a charging station network. According to an exemplary embodiment of the present disclosure, each component of the network system is an internet-connected device. A user 401 may travel as a passenger in an AV 400. The user 401 may interact with a cloud-storage module via a vehicle-based user interface 410 or user device-based user interface 420. The user device-based user interface 420 may be a user device 425 such as a smartphone. According to an embodiment, the vehicle-based user interface 410 and the user device-based user interface 420 each comprise a similarly configured processing circuitry. The processing circuitry may be configured to receive, process, encode, and transmit user input from a user interface. The processing circuitry may be further configured to receive, process, and generate output in response to user input from a user interface. Moreover, the processing circuitry may be configured to receive, decode, process, and generate output in response to information acquired from one or more charging stations 407 of a charging network 408 via a cloud-storage module 406. Communication between one or more user interfaces (vehicle-based 410 and user device-based 420), the cloud-storage module 406, and the network of charging stations 408 may be completed wirelessly 405 by a plurality of suitable modalities including but not limited to ultra-high frequency (UHF) radiofrequencies. Communication between an individual charging port 413 and the cloud-storage module 406 may be completed wirelessly 405 by a plurality of suitable modalities including but not limited to UHF radiofrequencies and may also comprise wired technologies 409 including but not limited to Ethernet.

According to an embodiment, identifier keys associated with the AV 400 and with the charging port 413 are stored in the cloud-storage module 406 until accessed by the respective parties.

FIG. 5A and FIG. 5B are illustrations of a charging subsystem of an autonomous vehicle and a charging arm in a retracted state and a deployed state. According to an exemplary embodiment of the present disclosure, the AV 500 has navigated to a reserved charging port 513 at a charging station 507. Initially, shown in FIG. 5A, the charging arm is in a retracted state 515' and housed within a charging arm housing 515. The AV 500 then positions the charging arm 515' over a charging plate 514 of the charging port 513. A GPS unit attached to the charging arm housing 515 may be used, in coordination with the known coordinates of the charging plate 514, to properly position the AV 500. Such geolocation techniques are understood by one of ordinary skill in the art. Having properly positioned the charging arm housing 515 over the charging plate 514, authentication of the AV 500 and the charging port 513 may proceed. According to an embodiment, a geofence may be disposed around a perimeter of the charging port 513. The geofence is of a shape sufficient to include a respective charging plate 514 and a properly aligned AV 500. According to an embodiment, as the AV 500 enters the geofence, the keys are made visible to the AV 500 and the charging port 513. Once the identifier keys are matched between the charging port 513 and the AV 500, charging may be initiated.

In FIG. 5B, a charging arm in a deployed state 515" has come into contact with the charging plate 514. Follow receipt of the intended charge, the charging arm 515" is retracted into the charging arm housing 515 and the AV 500 returns to the location of the user.

In an exemplary embodiment, charging of the AV 500 is performed via conduction. In another embodiment, charging of the AV 500 is performed via wireless power transfer techniques including but not limited to inductive coupling.

Figure 6:
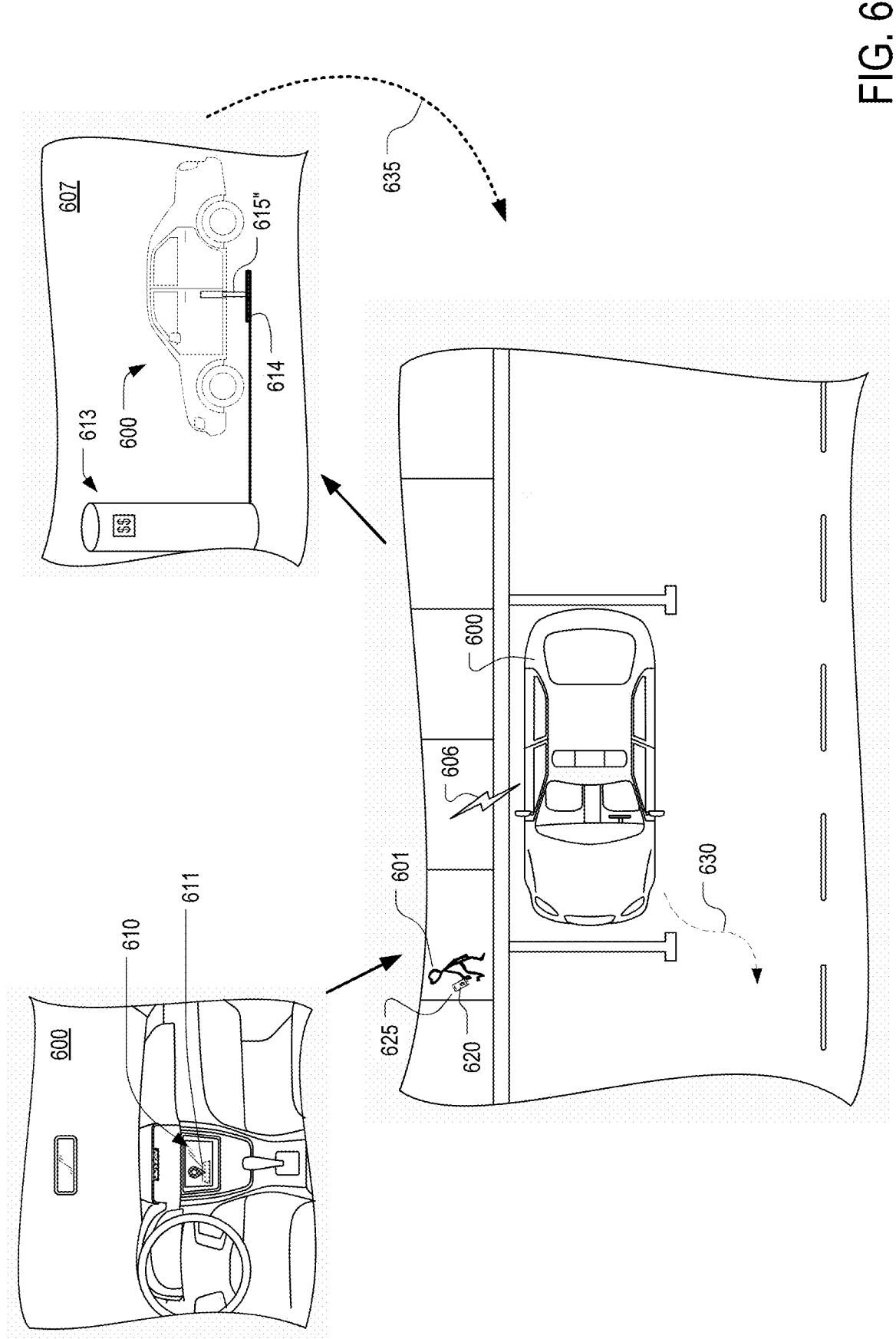
FIG. 6 is a diagram of an implementation of the present disclosure, according to an exemplary embodiment.

FIG. 6 is a diagram of an implementation of the present disclosure. According to an exemplary embodiment, a user is traveling as a passenger in an AV 600 and indicates via the vehicle-based user interface 610 an intent to have the AV 600 charge the vehicle battery while the user visits a shopping mall. The vehicle subsystem of the AV 600 responds by offering, via the vehicle-based user interface 610, a charging station recommendation on a navigational display 611, indicating the distance and travel time to the charging station, as well as charging price and charging time. The user approves the recommended charging station via the vehicle-based user interface 610 and plans to return to the drop off location at the end of the charging time. After the AV 600 delivers the user 601 to the intended shopping destination, the AV 600 begins navigation to the selected charging station 630. As the AV 600 departs, the user 601 decides to go to another store and so commands the AV 600, via the user device-based user interface 620, to delay returning to the drop off location for an additional 20 minutes. In an embodiment, the user device 625 is a smartphone. As the AV 600 arrives at the charging station 607, identifier keys assigned to the charging port 613 and AV 600 during charging station selection are made visible and matched as the AV 600 enters the geofence established around the charging port 613. Once authenticated, the AV 600 deploys the charging arm 615" into conductive contact with the charging plate 614. After dispensing the intended charge, the charging arm retracts into the charging arm housing of the AV 600. After the commanded 20 minutes of additional wait time, the AV 600 returns to the shopping mall 635 to retrieve its user 601.

Figure 7:
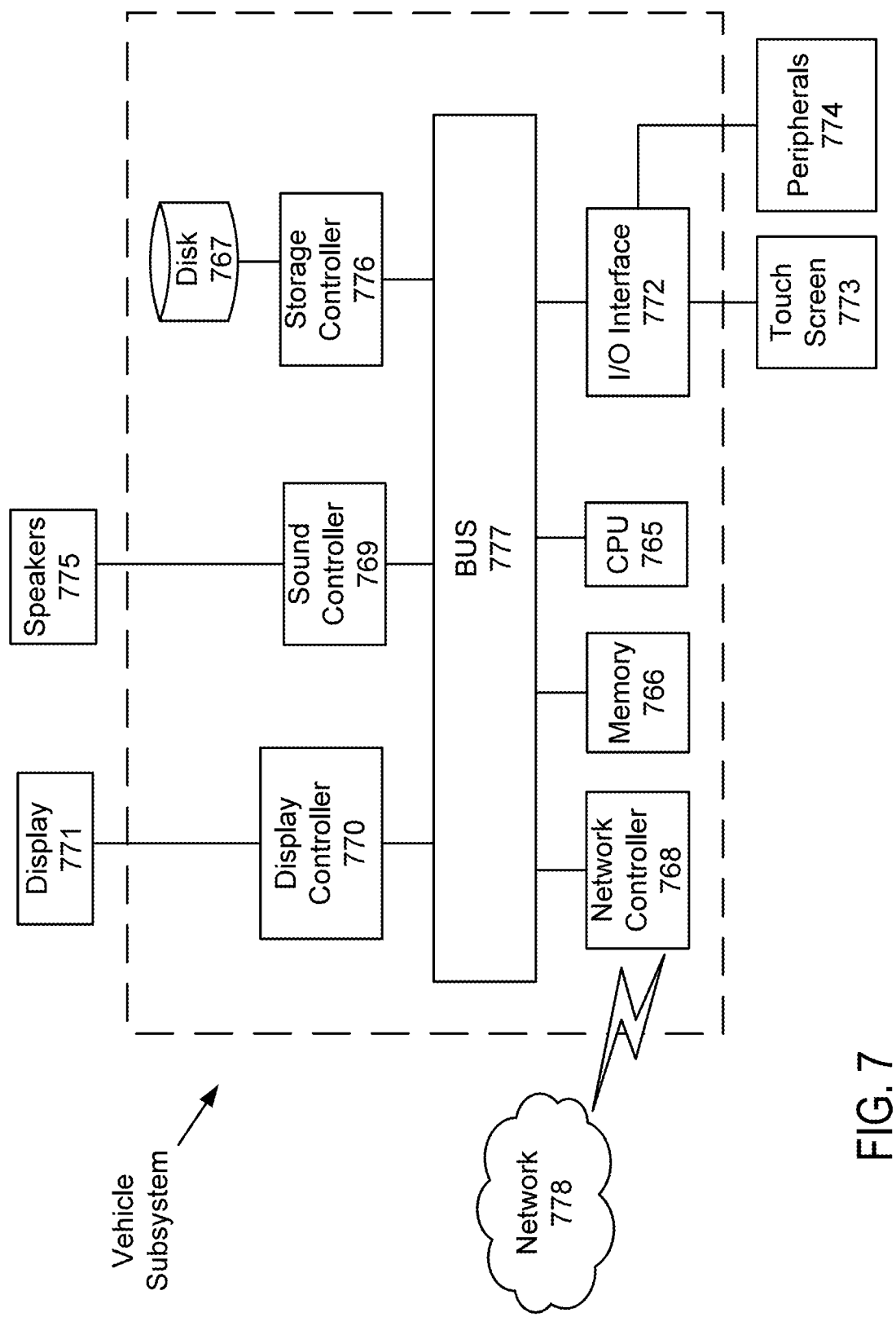
FIG. 7 is a schematic of hardware of a vehicle subsystem of an autonomous vehicle, according to an exemplary embodiment of the present disclosure.

Next, a hardware description of a vehicle subsystem according to exemplary embodiments is described with reference to FIG. 7. In FIG. 7, the vehicle subsystem includes a CPU 765 which performs the processes described above/below. The process data and instructions may be stored in memory 766. These processes and instructions may also be stored on a storage medium disk 767 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the vehicle subsystem communicates, such as a server or computer.

Further, the claimed advancements may be provided as a utility application, background daemon, or component of an operating system, or combination thereof, executing in conjunction with CPU 765 and an operating system such as Microsoft Windows 7, UNIX, Solaris, LINUX, Apple MAC-OS and other systems known to those skilled in the art.

The hardware elements in order to achieve the vehicle subsystem may be realized by various circuitry elements, known to those skilled in the art. For example, CPU 765 may be a Xenon or Core processor from Intel of America or an Opteron processor from AMD of America, or may be other processor types that would be recognized by one of ordinary skill in the art. Alternatively, the CPU 765 may be implemented on an FPGA, ASIC, PLD or using discrete logic circuits, as one of ordinary skill in the art would recognize. Further, CPU 765 may be implemented as multiple processors cooperatively working in parallel to perform the instructions of the inventive processes described above.

The vehicle subsystem in FIG. 7 also includes a network controller 768, such as an Intel Ethernet PRO network interface card from Intel Corporation of America, for interfacing with network 778. As can be appreciated, the network 778 can be a public network, such as the Internet, or a private network such as an LAN or WAN network, or any combination thereof and can also include PSTN or ISDN sub-networks. The network 778 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The vehicle subsystem further includes a display controller 770, such as a NVIDIA GeForce GTX or Quadro graphics adaptor from NVIDIA Corporation of America for interfacing with display 770, such as a Hewlett Packard HPL2445w LCD monitor. A general purpose I/O interface 772 interfaces with a touch screen panel 773 on or separate from display 770. General purpose I/O interface also connects to a variety of peripherals 774.

A sound controller 769 is also provided in the vehicle subsystem, such as Sound Blaster X-Fi Titanium from Creative, to interface with speakers/microphone 775 thereby providing sounds and/or music.

The general purpose storage controller 776 connects the storage medium disk 767 with communication bus 777, which may be an ISA, EISA, VESA, PCI, or similar, for interconnecting all of the components of the vehicle subsystem. A description of the general features and functionality of the display 771 as well as the display controller 770, storage controller 776, network controller 768, sound controller 769, and general purpose I/O interface 772 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The above-described hardware description is a non-limiting example of corresponding structure for performing the functionality described herein.

Figure 8:
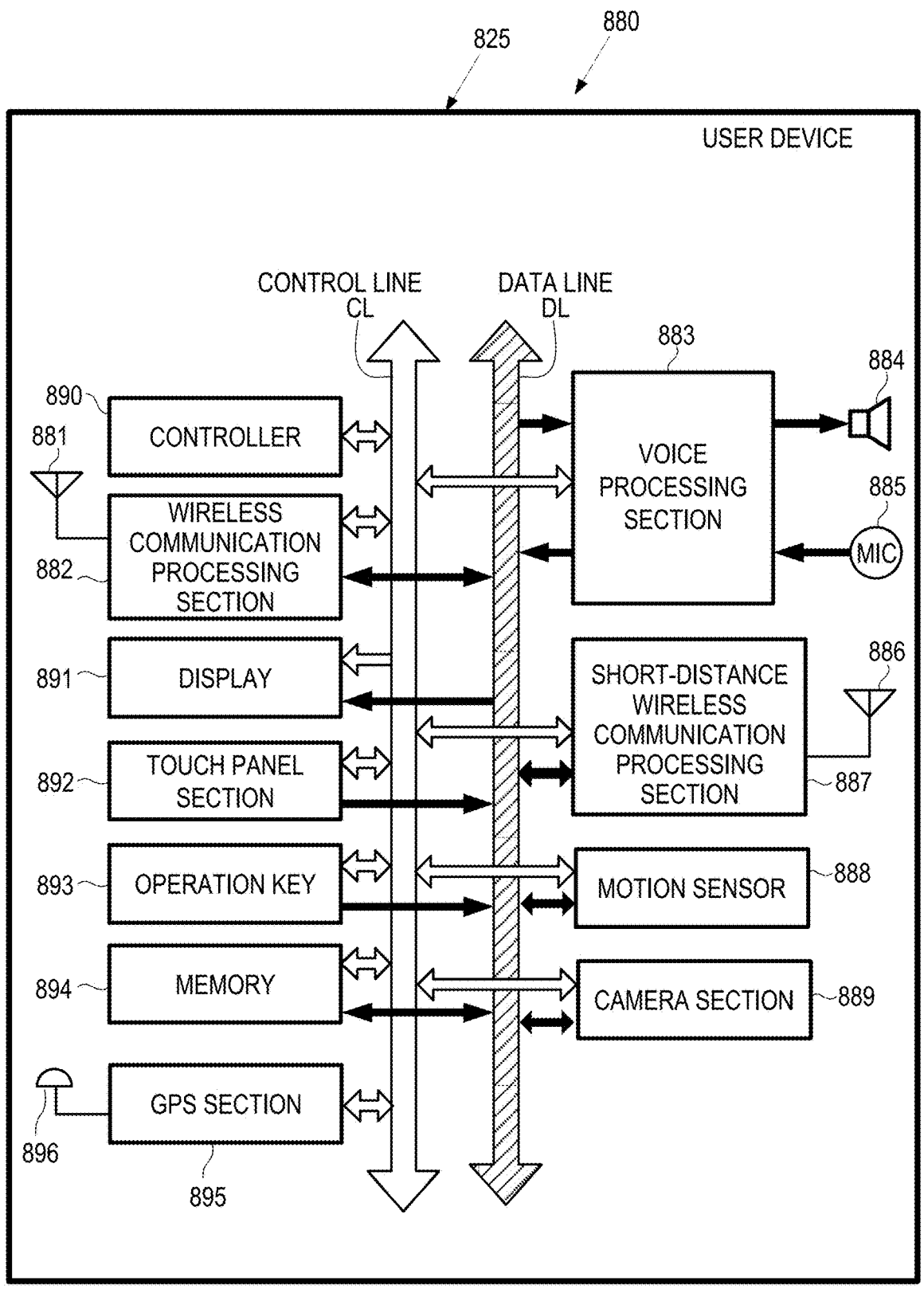
FIG. 8 is a schematic of hardware of a user device, according to an exemplary embodiment of the present disclosure.

FIG. 8 is a more detailed block diagram illustrating an exemplary user device 880 according to certain embodiments of the present disclosure. In certain embodiments, user device 880 may be a user device or smartphone 825. However, the skilled artisan will appreciate that the features described herein may be adapted to be implemented on other devices (e.g., a laptop, a tablet, a server, an e-reader, a camera, a navigation device, etc.). The exemplary user device 880 of FIG. 8 includes a controller 890 and a wireless communication processor 882 connected to an antenna 881. A speaker 884 and a microphone 885 are connected to a voice processor 883.

The controller 890 is an example of a control unit and may include one or more Central Processing Units (CPUs), each controlling each element in the user device 880 to perform functions related to communication control, audio signal processing, control for the audio signal processing, still and moving image processing and control, and other kinds of signal processing. The controller 890 may perform these functions by executing instructions stored in a memory 894. Alternatively or in addition to the local storage of the memory 894, the functions may be executed using instructions stored on an external device accessed on a network or on a non-transitory computer readable medium.

The memory 894 is an example of a storage unit and includes but is not limited to Read Only Memory (ROM), Random Access Memory (RAM), or a memory array including a combination of volatile and non-volatile memory units. The memory 894 may be utilized as working memory by the controller 890 while executing the processes and algorithms of the present disclosure. Additionally, the memory 894 may be used for long-term storage, e.g., of image data and information related thereto.

The user device 880 includes a control line CL and data line DL as internal communication bus lines. Control data to/from the controller 890 may be transmitted through the control line CL. The data line DL may be used for transmission of voice data, display data, etc.

The antenna 881 transmits/receives electromagnetic wave signals between base stations for performing radio-based communication, such as the various forms of cellular telephone communication. The wireless communication processor 882 controls the communication performed between the user device 880 and other external devices via the antenna 881. For example, the wireless communication processor 882 may control communication between base stations for cellular phone communication.

The speaker 884 emits an audio signal corresponding to audio data supplied from the voice processor 883. The microphone 885 detects surrounding audio and converts the detected audio into an audio signal. The audio signal may then be output to the voice processor 883 for further processing. The voice processor 883 demodulates and/or decodes the audio data read from the memory 894 or audio data received by the wireless communication processor 882 and/or a short-distance wireless communication processor 887. Additionally, the voice processor 883 may decode audio signals obtained by the microphone 885.

The exemplary user device 880 may also include a display 891, a touch panel 892, an operation key 893, and a short-distance communication processor 887 connected to an antenna 886. The display 891 may be a Liquid Crystal Display (LCD), an organic electroluminescence display panel, or another display screen technology. In addition to displaying still and moving image data, the display 891 may display operational inputs, such as numbers or icons which may be used for control of the user device 880. The display 891 may additionally display a GUI for a user to control aspects of the user device 880 and/or other devices. Further, the display 891 may display characters and images received by the user device 880 and/or stored in the memory 894 or accessed from an external device on a network. For example, the user device 880 may access a network such as the Internet and display text and/or images transmitted from a Web server.

The touch panel 892 may include a physical touch panel display screen and a touch panel driver. The touch panel 892 may include one or more touch sensors for detecting an input operation on an operation surface of the touch panel display screen. The touch panel 892 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 892 may detect when the stylus approaches/contacts the operation surface of the touch panel display (similar to the case in which a finger is used for the touch operation).

In certain aspects of the present disclosure, the touch panel 892 may be disposed adjacent to the display 891 (e.g., laminated) or may be formed integrally with the display 891. For simplicity, the present disclosure assumes the touch panel 892 is formed integrally with the display 891 and therefore, examples discussed herein may describe touch operations being performed on the surface of the display 891 rather than the touch panel 892. However, the skilled artisan will appreciate that this is not limiting.

For simplicity, the present disclosure assumes the touch panel 892 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 892 may include transparent electrode touch sensors arranged in the X-Y direction on the surface of transparent sensor glass.

The touch panel driver may be included in the touch panel 892 for control processing related to the touch panel 892, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 892 may detect a position of a user's finger around an edge of the display panel 891 (e.g., gripping a protective case that surrounds the display/touch panel). Signals may be transmitted by the touch panel driver, e.g. in response to a detection of a touch operation, in response to a query from another element based on timed data exchange, etc.

The touch panel 892 and the display 891 may be surrounded by a protective casing, which may also enclose the other elements included in the user device 880. In certain embodiments, a position of the user's fingers on the protective casing (but not directly on the surface of the display 891) may be detected by the touch panel 892 sensors. Accordingly, the controller 890 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 890 may be configured to detect which hand is holding the user device 880, based on the detected finger position. For example, the touch panel 892 sensors may detect a plurality of fingers on the left side of the user device 880 (e.g., on an edge of the display 891 or on the protective casing), and detect a single finger on the right side of the user device 880. In this exemplary scenario, the controller 890 may determine that the user is holding the user device 880 with his/her right hand because the detected grip pattern corresponds to an expected pattern when the user device 880 is held only with the right hand.

The operation key 893 may include one or more buttons or similar external control elements, which may generate an operation signal based on a detected input by the user. In addition to outputs from the touch panel 892, these operation signals may be supplied to the controller 890 for performing related processing and control. In certain aspects of the present disclosure, the processing and/or functions associated with external buttons and the like may be performed by the controller 890 in response to an input operation on the touch panel 892 display screen rather than the external button, key, etc. In this way, external buttons on the user device 880 may be eliminated in lieu of performing inputs via touch operations, thereby improving water-tightness.

The antenna 886 may transmit/receive electromagnetic wave signals to/from other external apparatuses, and the short-distance wireless communication processor 887 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 887.

The user device 880 may include a motion sensor 888. The motion sensor 888 may detect features of motion (i.e., one or more movements) of the user device 880. For example, the motion sensor 888 may include an accelerometer to detect acceleration, a gyroscope to detect angular velocity, a geomagnetic sensor to detect direction, a geolocation sensor to detect location, etc., or a combination thereof to detect motion of the user device 880. In certain embodiments, the motion sensor 888 may generate a detection signal that includes data representing the detected motion. For example, the motion sensor 888 may determine a number of distinct movements in a motion (e.g., from start of the series of movements to the stop, within a predetermined time interval, etc.), a number of physical shocks on the user device 880 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 890, whereby further processing may be performed based on data included in the detection signal. The motion sensor 888 can work in conjunction with a Global Positioning System (GPS) section 895. The GPS section 895 detects the present position of the user device 880. The information of the present position detected by the GPS section 895 is transmitted to the controller 890. An antenna 896 is connected to the GPS section 895 for receiving and transmitting signals to and from a GPS satellite.

The user device 880 may include a camera section 889, which includes a lens and shutter for capturing photographs of the surroundings around the user device 880. In an embodiment, the camera section 889 captures surroundings of an opposite side of the user device 880 from the user. The images of the captured photographs can be displayed on the display panel 891. A memory section saves the captured photographs. The memory section may reside within the camera section 889 or it may be part of the memory 894. The camera section 889 can be a separate feature attached to the user device 880 or it can be a built-in camera feature.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for semi-autonomous charging of an autonomous vehicle battery, comprising:
   measuring, by processing circuitry, a current charge of the autonomous vehicle battery;
   determining, by the processing circuitry and based upon the measuring of the current charge of the autonomous vehicle battery, a battery charge residual capacity of the autonomous vehicle battery;
   acquiring, by the processing circuitry, from a network of charging stations and based upon the determining of the battery charge residual capacity of the autonomous vehicle battery with respect to a pre-determined threshold, information related to one or more charging stations of the network of charging stations;
   recommending, by the processing circuitry, a charging station based upon the information related to the one or more charging stations of the network of charging stations;
   querying, via a user interface, a selection regarding the recommended charging station;
   reserving, by the processing circuitry and based upon the selection regarding the recommended charging station, a charging port at the selected charging station;
   navigating, by the processing circuitry, an autonomous vehicle associated with the autonomous vehicle battery to the reserved charging port at the selected charging station; and
   receiving, via a charging subsystem including a charging arm deployable from a charging arm housing disposed within the autonomous vehicle, a charge from a charging plate of the reserved charging port at the selected charging station, the charging plate being disposed in ground and the charging arm being configured to receive the charge from the charging plate upon deployment into contact with the charging plate.

2. The method according to claim 1, further comprising deploying, by the processing circuitry, the charging arm based upon co-location of the charging arm with the charging plate of the reserved charging port at the selected charging station.

3. The method according to claim 2, wherein the co-location is based on a location of a global positioning system receiver of the charging arm housing relative to geographic coordinates of the charging plate of the reserved charging port at the selected charging station.

4. The method according to claim 1, wherein the information related to the one or more charging stations of the network of charging stations includes charging port availability, distance from a current position, travel time from the current position, estimated time to charge the autonomous vehicle battery, estimated cost of charging the autonomous vehicle battery, or a combination thereof.

5. The method according to claim 1, further comprising
   establishing, by the processing circuitry, a geofence for the reserved charging port at the selected charging station; and
   determining, by the processing circuitry, whether the autonomous vehicle is within the established geofence, wherein the determining whether the autonomous vehicle is within the established geofence comprises estimating a geolocation of the autonomous vehicle in context of the established geofence, wherein receiving, via the charging subsystem, the charge from the charging plate of the reserved charging port at the selected charging station is predicate upon a positive determination that the autonomous vehicle is within the established geofence.

6. An autonomous vehicle, comprising:
an autonomous vehicle battery;
a user interface;
a charging subsystem including a charging arm deployable from a charging arm housing disposed within the autonomous vehicle; and
processing circuitry configured to
measure a current charge of the autonomous vehicle battery;
determine, based upon the measurement of the current charge of the autonomous vehicle battery, a battery charge residual capacity of the autonomous vehicle battery;
acquire, from a network of charging stations and based upon the determination of the battery charge residual capacity of the autonomous vehicle battery with respect to a pre-determined threshold, information related to one or more charging stations of the network of charging stations;
recommend, based upon the information related to the one or more charging stations of the network of charging stations, a charging station;
reserve, based upon a selection regarding the recommended charging station, a charging port at the selected charging station; and
navigate the autonomous vehicle to the reserved charging port at the selected charging station,
wherein the user interface is configured to receive the selection regarding the recommended charging station in response to a query,
wherein the charging subsystem is configured to receive a charge from a charging plate of the reserved charging port at the selected charging station, the charging plate being disposed in ground and the charging arm of the charging subsystem being configured to receive the charge from the charging plate upon deployment into contact with the charging plate.

7. The autonomous vehicle according to claim 6, wherein the processing circuitry is further configured to
deploy the charging arm based upon co-location of the charging arm with the charging plate of the reserved charging port at the selected charging station.

8. The autonomous vehicle according to claim 7, wherein the co-location is based on a location of a global positioning system receiver of the charging arm housing relative to geographic coordinates of the charging plate of the reserved charging port at the selected charging station.

9. The autonomous vehicle according to claim 6, wherein the information related to the one or more charging stations of the network of charging stations includes charging port availability, distance from a current position, travel time from the current position, estimated time to charge the autonomous vehicle battery, estimated cost of charging the autonomous vehicle battery, or a combination thereof.

10. The autonomous vehicle according to claim 6, wherein the processing circuitry is further configured to
establish a geofence for the reserved charging port at the selected charging station; and
determine whether the autonomous vehicle is inside the established geofence,
wherein the determination of whether the autonomous vehicle is within the established geofence comprises an estimation of a geolocation of the autonomous vehicle in context of the established geofence,
wherein receipt of the charge from the charging plate of the reserved charging port at the selected charging station is predicate upon a positive determination that the autonomous vehicle is within the established geofence.

11. A method for semi-autonomous charging of an autonomous vehicle battery, comprising:
measuring, by processing circuitry and in response to receiving a command via a user interface, a current charge of the autonomous vehicle battery;
determining, by the processing circuitry and based upon the measuring of the current charge of the autonomous vehicle battery, a battery charge residual capacity of the autonomous vehicle battery;
acquiring, by the processing circuitry, from a network of charging stations and based upon the determining the battery charge residual capacity of the autonomous vehicle battery with respect to a pre-determined threshold, information related to one or more charging stations of the network of charging stations;
recommending, by the processing circuitry, a charging station based upon the information related to the one or more charging stations of the network of charging stations;
querying, via the user interface, a selection regarding the recommended charging station;
reserving, by the processing circuitry and based upon the selection regarding the recommended charging station, a charging port at the selected charging station;
navigating, by the processing circuitry, the autonomous vehicle to the reserved charging port at the selected charging station; and
receiving, via a charging subsystem including a charging arm deployable from a charging arm housing disposed within the autonomous vehicle, a charge from a charging plate of the reserved charging port at the selected charging station, the charging plate being disposed in ground and the charging arm being configured to receive the charge from the charging plate upon deployment into contact with the charging plate.

12. The method according to claim 11, further comprising
deploying, by the processing circuitry, the charging arm based upon co-location of the charging arm with the charging plate of the reserved charging port at the selected charging station.

13. The method according to claim 12, wherein the co-location is based on a location of a global positioning system receiver of the charging arm housing relative to geographic coordinates of the charging plate of the reserved charging port at the selected charging station.

14. The method according to claim 11, wherein the information related to the one or more charging stations of the network of charging stations includes charging port availability, distance from a current position, travel time from the current position, estimated time to charge the autonomous vehicle battery, estimated cost of charging the autonomous vehicle battery, or a combination thereof.

15. The method according to claim 11, further comprising
establishing, by the processing circuitry, a geofence for the reserved charging port at the selected charging station; and
determining, by the processing circuitry, whether the autonomous vehicle is within the established geofence, wherein the determining whether the autonomous vehicle is within the established geofence comprises estimating a geolocation of the autonomous vehicle in context of the established geofence, wherein receiving, via the charging subsystem, the charge from the charging plate of the reserved charging port at the selected charging station is predicate upon a positive determination that the autonomous vehicle is within the established geofence.

16. An autonomous vehicle, comprising:
an autonomous vehicle battery;
a user interface;
a charging subsystem including a charging arm deployable from a charging arm housing disposed within the autonomous vehicle; and
a processing circuitry configured to
  measure, in response to receiving a command via the user interface, a current charge of the autonomous vehicle battery;
  determine, based upon the measurement of the current charge of the autonomous vehicle battery, a battery charge residual capacity of the autonomous vehicle battery;
  acquire, from a network of charging stations and based upon the determination of the battery charge residual capacity of the autonomous vehicle battery with respect to a pre-determined threshold, information related to one or more charging stations of the network of charging stations;
  recommend, based upon the information related to the one or more charging stations of the network of charging stations, a charging station;
  reserve, based upon a selection regarding the recommended charging station, a charging port at the selected charging station; and
  navigate the autonomous vehicle to the reserved charging port at the selected charging station,
wherein the user interface is configured to receive the selection regarding the recommended charging station in response to a query,
wherein the charging subsystem is configured to receive a charge from a charging plate of the reserved charging port at the selected charging station, the charging plate being disposed in ground and the charging arm of the charging subsystem being configured to receive the charge from the charging plate upon deployment into contact with the charging plate.

17. The autonomous vehicle according to claim 16, wherein the processing circuitry is further configured to
  deploy the charging arm based upon co-location of the charging arm with the charging plate of the reserved charging port at the selected charging station.

18. The autonomous vehicle according to claim 17, wherein the co-location is based on a location of a global positioning system receiver of the charging arm housing relative to geographic coordinates of the charging plate of the reserved charging port at the selected charging station.

19. The autonomous vehicle according to claim 16, wherein the information related to the one or more charging stations of the network of charging stations includes charging port availability, distance from a current position, travel time from the current position, estimated time to charge the autonomous vehicle battery, estimated cost of charging the autonomous vehicle battery, or a combination thereof.

20. The autonomous vehicle according to claim 16, wherein the processing circuitry is further configured to
  establish a geofence for the reserved charging port at the selected charging station; and
  determine whether the autonomous vehicle is within the established geofence,
  wherein the determination of whether the autonomous vehicle is within the established geofence comprises an estimation of a geolocation of the autonomous vehicle in context of the established geofence,
  wherein receipt of the charge from the charging plate of the reserved charging port at the selected charging station is predicate upon a positive determination that the autonomous vehicle is within the established geofence.

* * * * *